US012238503B2

(12) United States Patent
Chen et al.

(10) Patent No.: US 12,238,503 B2
(45) Date of Patent: Feb. 25, 2025

(54) SYSTEMS AND METHODS FOR CALIBRATING AUDIO DEVICES

(71) Applicant: Beken Corporation, Shanghai (CN)

(72) Inventors: Lulai Chen, Shanghai (CN); Weifeng Wang, Shanghai (CN)

(73) Assignee: Beken Corporation, Shanghai (CN)

( * ) Notice: Subject to any disclaimer, the term of this patent is extended or adjusted under 35 U.S.C. 154(b) by 229 days.

(21) Appl. No.: 18/189,691

(22) Filed: Mar. 24, 2023

(65) Prior Publication Data

US 2024/0314510 A1 Sep. 19, 2024

(30) Foreign Application Priority Data

Mar. 15, 2023 (CN) ......................... 202310252864.1

(51) Int. Cl.
*H04S 7/00* (2006.01)
*H04R 29/00* (2006.01)

(52) U.S. Cl.
CPC ........... *H04S 7/301* (2013.01); *H04R 29/001* (2013.01)

(58) Field of Classification Search
CPC .......... H04S 7/301; H04S 7/307; H04S 7/305; H04R 29/001; H04R 3/04; H04R 2227/003; H04R 25/70; H03G 99/00
See application file for complete search history.

(56) References Cited

U.S. PATENT DOCUMENTS

| | | | | |
|---|---|---|---|---|
| 9,137,619 | B2 * | 9/2015 | Nackvi | H04S 7/307 |
| 2017/0286052 | A1 * | 10/2017 | Hartung | G06F 3/165 |
| 2019/0075414 | A1 * | 3/2019 | Bush | H03G 3/32 |

* cited by examiner

*Primary Examiner* — Yosef K Laekemariam
(74) *Attorney, Agent, or Firm* — Schwegman Lundberg & Woessner, P.A.

(57) ABSTRACT

An audio device calibration system includes an acoustic sensor, one or more processors, and a memory storing instructions that, when executed by the one or more processors, configure the processors to obtain a response curve of a device under test, identify an error curve, and calibrate the audio device based on a compensation curve that corresponds to the error curve to perform automatic quality control and calibration for audio devices.

20 Claims, 6 Drawing Sheets

SYSTEMS AND METHODS FOR CALIBRATING AUDIO DEVICES

CROSS REFERENCE TO RELATED APPLICATION

This application claims priority to and incorporates by reference Chinese patent application no. 202310252864.1 filed 15 Mar. 2023.

TECHNICAL FIELD

The present disclosure generally relates to calibration technology. In particular, example embodiments of the present disclosure address systems and methods for quality checks and calibrating audio devices.

BACKGROUND

The present disclosure mainly concerns quality control in the production of audio devices like headphones, earbuds, and speakers. Inconsistencies of audio devices may arise during the production process due to various factors. Some inconsistencies include inconsistent response curves of finished audio devices and unbalanced left and right speakers.

BRIEF SUMMARY

A method for calibrating audio devices comprising obtaining, by one or more processors of a calibration device, an error curve of an output from a device under test (DUT); identifying, by the one or more processors, a target segment of the error curve; determining, by the one or more processors, a compensation curve that corresponds to the error curve based on a compensation function that corresponds to the target segment of the error curve; finding, by the one or more processors, a plurality of biquadratic coefficients that correspond to the compensation curve; and adjusting, by the one or more processors, a plurality of DUT coefficients based on the plurality of biquadratic coefficients.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

The calibration system for audio devices can quickly and accurately detect whether a finished audio device is qualified/satisfactory, and at the same time compensate for the gain and response curve of the finished audio device.

The present disclosure is suitable for most digital headphone products such as ordinary headphones, ordinary Bluetooth headphones, head-mounted Bluetooth headphones, and true wireless stereo (TWS) Bluetooth headphones. It can solve the problem of the inconsistent speaker curve during the mass production of the headphones, which may include inconsistencies in speaker unit production, front cavity mold of the speaker, finished product assembly, and other problems caused by the unbalanced curves of the finished headphones.

In addition to being used for equalizing left and right speakers, the present disclosure can also be used for automatic calibration of active-noise-canceling (ANC) headphone products.

The calibration system 100 improves the quality control process and the consistency of mass production, especially for ANC headphone products.

Figure 1:
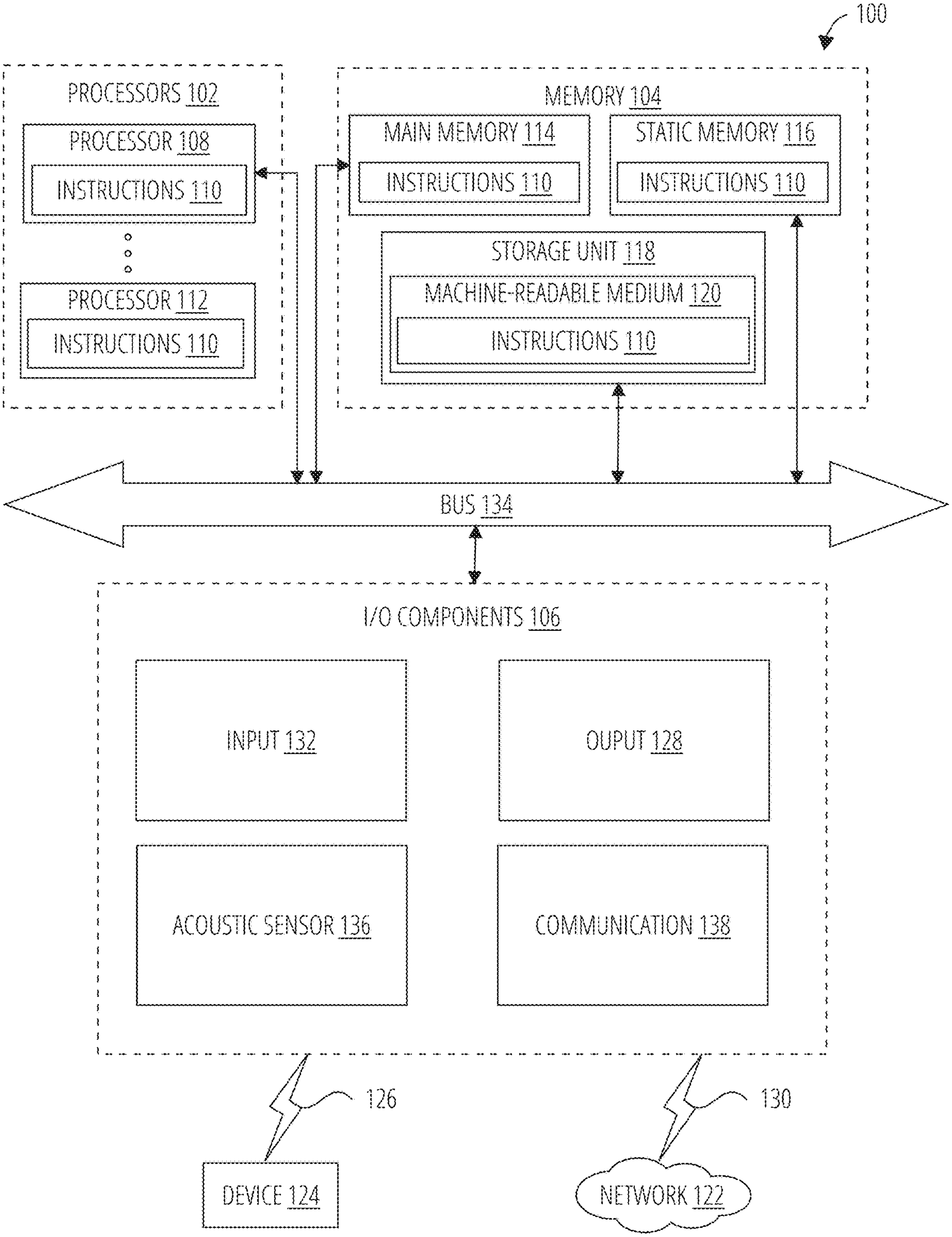
FIG. 1 is a diagrammatic representation of a machine, in the form of a computing apparatus within which a set of instructions may be executed for causing the machine to perform any one or more of the methodologies discussed herein in accordance with some examples.

FIG. 1 is a diagrammatic representation of a calibration system 100 within which instructions 110 (e.g., software, a program, an application, an applet, an app, or other executable code) for causing the calibration system 100 to perform any one or more of the methodologies discussed herein may be executed. For example, the instructions 110 may cause the calibration system 100 to execute any one or more of the methods described herein. The instructions 110 transform the general, non-programmed calibration system 100 into a particular calibration system 100 programmed to carry out the described and illustrated functions in the manner described. The calibration system 100 may operate as a standalone device or may be coupled (e.g., networked) to other machines. The calibration system 100 may comprise, but not be limited to, an acoustic sensor 136 or any machine capable of executing the instructions 110, sequentially or otherwise, that specify actions to be taken by the calibration system 100. Further, while a single calibration system 100 is illustrated, the term "machine" may also be taken to include a collection of machines that individually or jointly execute the instructions 110 to perform any one or more of the methodologies discussed herein.

The calibration system 100 may include processors 102, memory 104, and I/O components 106, which may be configured to communicate with one another via a bus 134. In an example, the processors 102 (e.g., a Central Processing Unit (CPU), a Reduced Instruction Set Computing (RISC) processor, a Complex Instruction Set Computing (CISC)

processor, a Graphics Processing Unit (GPU), a Digital Signal Processor (DSP), an ASIC, a Radio-Frequency Integrated Circuit (RFIC), another processor, or any suitable combination thereof) may include, for example, a processor 108 and a processor 112 that execute the instructions 110. The term "processor" is intended to include multi-core processors that may comprise two or more independent processors (sometimes referred to as "cores") that may execute instructions contemporaneously. Although FIG. 1 shows multiple processors 102, the calibration system 100 may include a single processor with a single core, a single processor with multiple cores (e.g., a multi-core processor), multiple processors with a single core, multiple processors with multiples cores, or any combination thereof.

The memory 104 includes a main memory 114, a static memory 116, and a storage unit 118, both accessible to the processors 102 via the bus 134. The main memory 104, the static memory 116, and storage unit 118 store the instructions 110 embodying any one or more of the methodologies or functions described herein. The instructions 110 may also reside, completely or partially, within the main memory 114, within the static memory 116, within machine-readable medium 120 within the storage unit 118, within one or more of the processors 102 (e.g., within the processor's cache memory), or any suitable combination thereof, during execution thereof by the calibration system 100.

The I/O) components 106 may include a wide variety of components to receive input, provide output, produce output, transmit information, exchange information, capture measurements, and so on. The specific I/O components 106 that are included in a particular machine will depend on the type of machine. For example, portable machines such as mobile phones may include a touch input device or other such input mechanisms, while a headless server machine will likely not include such a touch input device. It will be appreciated that the I/O) components 106 may include many other components that are not shown in FIG. 1. In various examples, the I/O components 106 may include output components 128 and input component 132. The output components 128 may include visual components (e.g., a display such as a plasma display panel (PDP), a light emitting diode (LED) display, a liquid crystal display (LCD), a projector, or a cathode ray tube (CRT)), acoustic components (e.g., speakers), other signal generators, and so forth. The input component 132 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further examples, the I/O components 106 may include an acoustic sensor 136 among a wide array of other components. The acoustic sensor 136 includes components to detect audio output, collect audio output of an audio device, and generate a response curve based on the audio output collected. In some embodiments, the acoustic sensor 136 is a high-precision IEC711 frequency response curve tester. In some embodiments, when the audio device is not a Bluetooth headphone, the acoustic sensor 136 collects audio output using a line-out control. The wide array of other components may provide indications, measurements, or signals associated with a surrounding physical environment.

Communication may be implemented using a wide variety of technologies. The I/O components 106 further include communication 138 operable to couple the calibration system 100 to a network 122 or device 124 via a coupling 130 and a coupling 126, respectively. For example, the communication 138 may include a network interface component or another suitable device to interface with the network 122. In further examples, the communication 138 may include wired communication components, wireless communication components, cellular communication components, Near Field Communication (NFC) components, Bluetooth® components (e.g., Bluetooth® Low Energy), Wi-Fi components, and other communication components to provide communication via other modalities. The device 124 may be another machine or any of a wide variety of peripheral devices (e.g., a peripheral device coupled via a USB).

Moreover, the communication 138 may detect identifiers or include components operable to detect identifiers. For example, the communication 138 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication 138, such as location via Internet Protocol (IP) geolocation, location via Wi-Fi® signal triangulation, location via detecting an NFC beacon signal that may indicate a particular location, and so forth.

The various memories (e.g., memory 104, main memory 114, static memory 116, and/or memory of the processors 102) and/or storage unit 118 may store one or more sets of instructions and data structures (e.g., software) embodying or used by any one or more of the methodologies or functions described herein. These instructions (e.g., the instructions 110), when executed by processors 102, cause various operations to implement the disclosed examples.

The instructions 110 may be transmitted or received over the network 122, using a transmission medium, via a network interface device (e.g., a network interface component included in the communication 138) and using any one of a number of well-known transfer protocols (e.g., hypertext transfer protocol (HTTP)). Similarly, the instructions 110 may be transmitted or received using a transmission medium via the coupling 126 (e.g., a peer-to-peer coupling) to the device 124.

Figure 2:
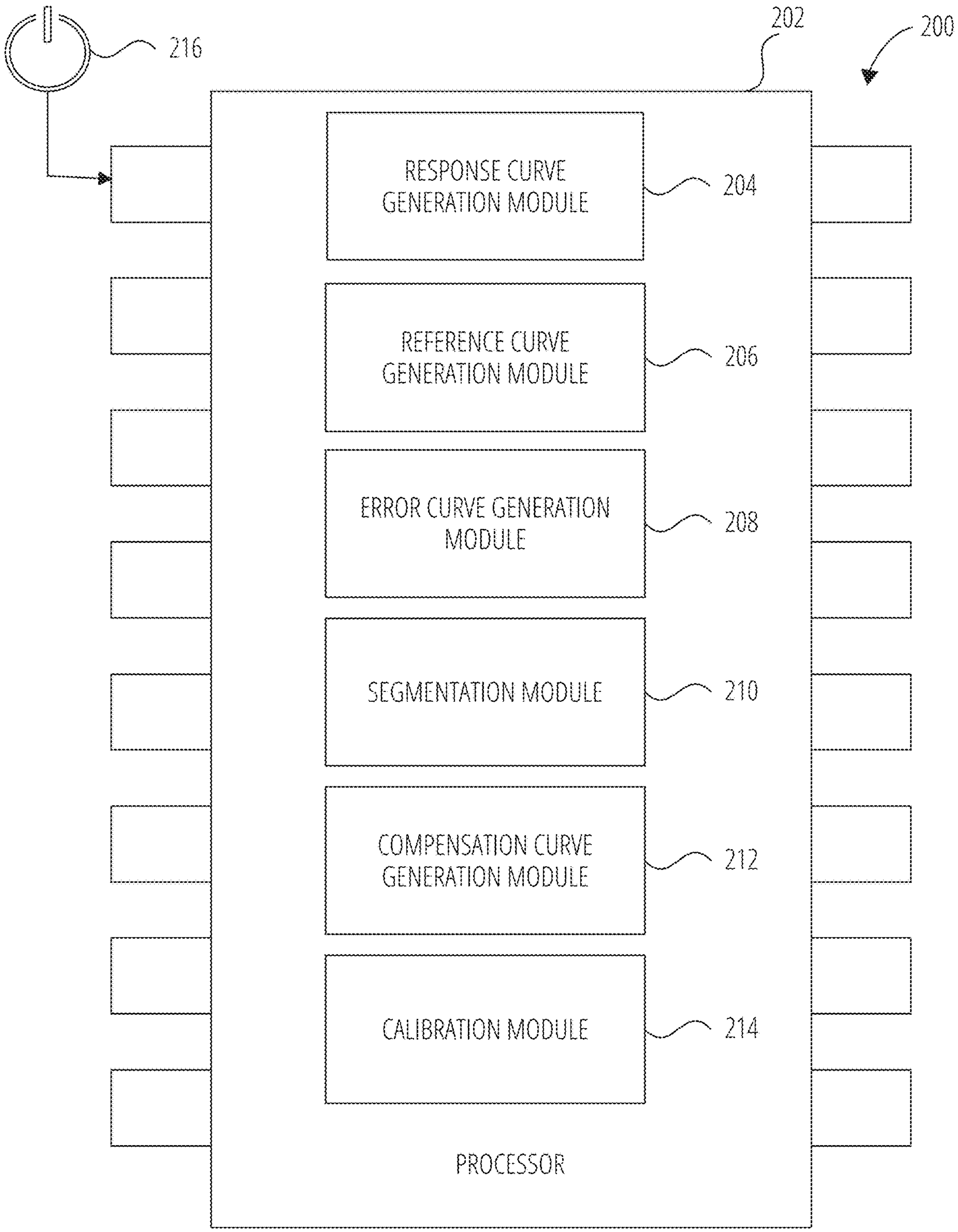
FIG. 2 is a diagrammatic representation of a processing environment 200, in accordance with some embodiments.

FIG. 2 is a diagrammatic representation of a processing environment 200, in accordance with some embodiments.

The processor 202 shown may be an example of processors 102, which include multiple processors (i.e., processor 108, processor 112, or combination thereof).

The processor 202 is shown to be coupled to a power source 216, and to include (either permanently configured or temporarily instantiated) modules, namely a response curve generation module 204, a reference curve generation module 206, an error curve generation module 208, a segmentation module 210, a compensation curve generation module 212, and a calibration module 214.

The response curve generation module 204 operationally generates a DUT response curve. The reference curve generation module 206 operationally obtains a reference curve. The error curve generation module 208 operationally obtains an error curve of the DUT. The segmentation module 210 operationally identifies a target segment of the error curve. The compensation curve generation module 212 operationally generates a compensation curve. The calibration module 214 operationally adjusts the DUT coefficients to calibrate the DUT. Further details regarding the operations performed by these modules are described below with reference to FIG. 3A.

Figure 3A:
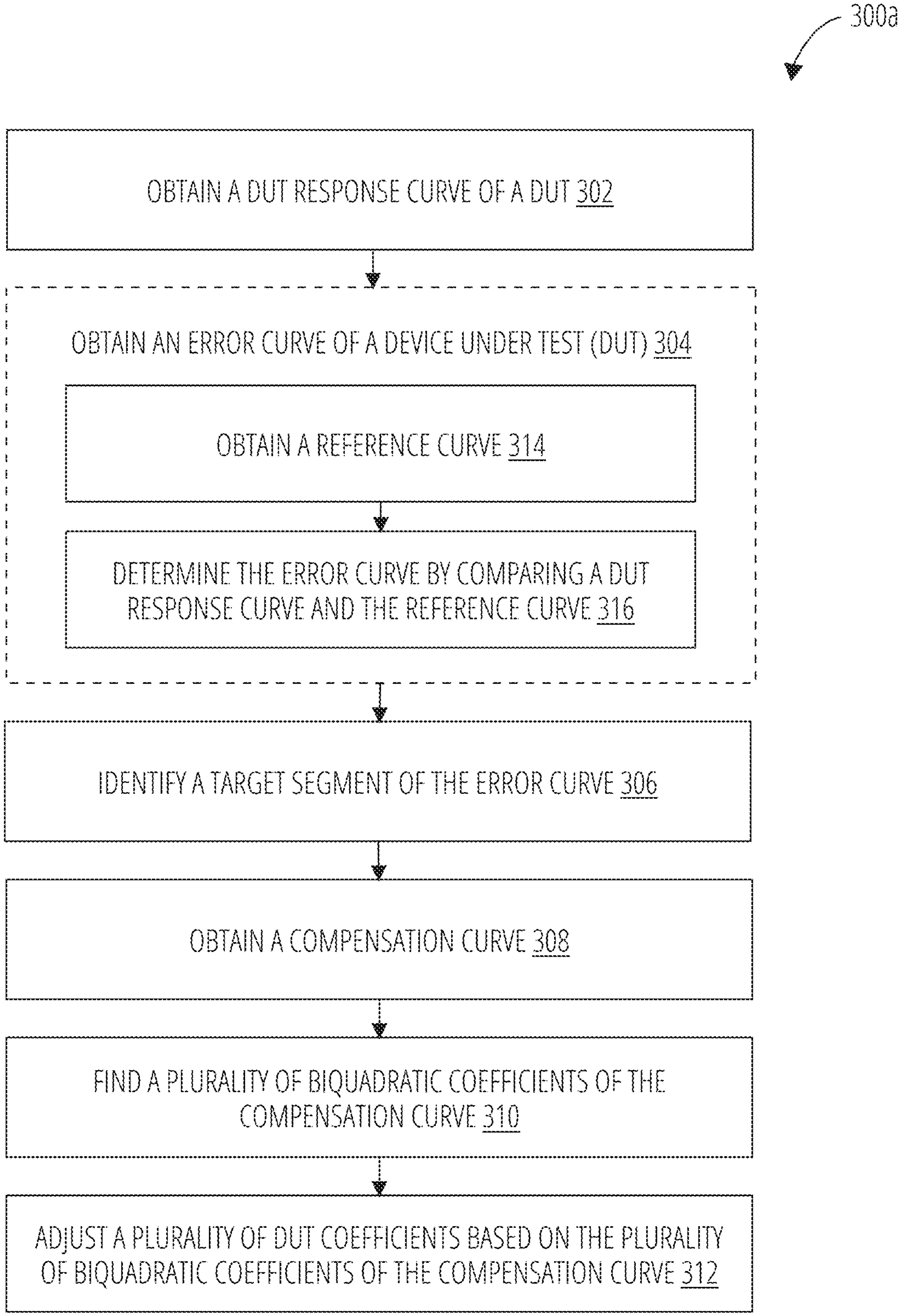
FIG. 3A is a flowchart diagram illustrating the operations of a calibration system in performing a method for calibrating a device under test (DUT), in accordance with some embodiments.

FIG. 3A is a flowchart diagram illustrating operations of a calibration system in performing a method for calibrating a device under test (DUT), in accordance with some embodiments. The method 300*a* may be embodied in computer-readable instructions for execution by one or more processors such that operations of the method 300*a* may be performed in part or in whole by the acoustic sensor 136, the memory 104, and the processors 102 of the calibration system; accordingly, the method 300*a* is described below by way of example with reference thereto. However, it shall be appreciated that at least some of the operations of the method 300*a* may be deployed on various other hardware configurations than the calibration system 100.

At operation 302, the calibration system 100 obtains a DUT response curve (i.e., DUT resp shown in FIG. 4) using an acoustic sensor 136. The acoustic sensor 136 detects an audio output of the DUT, collects the audio output, and generates a response curve based on the audio output collected. The DUT response curve may represent a relationship between response values and frequency values of the audio output. In some embodiments, the response values are measurements of acoustic power, the unit of which is decibel (dB). In some embodiments, the response values measure relative loudness. The unit of the frequency values is (Hz). In some embodiments, the frequency values are converted to a logarithmic scale, and their unit is denoted as Hz(Log).

At operation 304, the calibration system 100 obtains an error curve of the DUT by comparing the DUT response curve with a reference curve. The error curve represents a difference between the DUT response curve and the reference curve. In some embodiments, the difference may include the differences in response values between the DUT response curve and the reference curve. The error curve of the DUT is generated based on the difference. The reference curve provides a reference to the calibration system 100, which aims to calibrate the DUT so that the DUT response curve is more similar to the reference curve.

To obtain an error curve of the DUT 304 of the operation 304 may further include operation 314 and operation 316. At operation 314, the calibration system 100 obtains a reference curve. In some embodiments, the reference curve is arbitrarily created. In other embodiments, the reference curve is determined based on a predetermined number of sample response curves. The predetermined number of sample response curves correspond to outputs of a predetermined number of sample devices 124. In some embodiments, the predetermined number of sample devices 124 are randomly selected from production; the sample devices 124 are of the same type as the DUT. The calibration system 100 obtains the predetermined number of sample response curves using the acoustic sensor 136. In some embodiments, the calibration system 100 obtains a reference curve by taking an average of the predetermined number of sample response curves. In additional embodiments, the calibration system 100 selects one of the sample response curves as a reference curve; the selected sample response curve is a representative curve among the predetermined number of sample response curves.

At operation 316, the calibration system 100 obtains an error curve by determining the differences in response values between the reference curve and the DUT response curve. The differences correspond to error values of a DUT's output. An example embodiment of the error curve will be discussed with reference to FIG. 4.

At operation 306, the calibration system 100 identifies a target segment of the error curve. The error curve may be divided into multiple target segments and in various manners. In some embodiments, the position on which the error curve is divided is determined arbitrarily. In some embodiments, the position on which the error curve is divided is either a local minimum or local maximum (i.e., local extremum) on the curve to allow more accurate line-fitting. To illustrate, in FIG. 4, the error curve is labeled as REF-DUT Error. In some embodiments, a target segment of the REF-DUT error curve may range from frequency 8,000 Hz (Log)-20,000 Hz (Log) because the error value that corresponds to frequency value 8,000 Hz (Log) is a local minimum. Having a target segment that starts with a local minimum allows the segment to be fitted by a more accurate function. In some embodiments, the target segment of the error curve is the entire error curve. In additional embodiments, the error curve is made up of multiple target segments. The multiple target segments are divided by local minimums.

At operation 308, the calibration system 100 determines a compensation curve. The compensation curve may compensate the DUT response curve such that by aggregating the compensation curve and the DUT response curve, the resulting curve shall be moved closer to the reference curve. The compensation curve may be generated based on one or more compensation functions. The compensation functions are in turn generated based on one or more target segments on the error curve. In some embodiments, the calibration system 100 first determines one or more compensation functions that fit the one or more target segments' reflections over the X-axis. The compensation curve is generated by aggregating the one or more curves corresponding to the one or more compensation functions. The one or more compensation functions may be in a form of biquadratic equation.

At operation 310, the calibration system 100 finds a plurality of biquadratic coefficients of the compensation curve. In some embodiments, the plurality of biquadratic coefficients are biquadratic cascade IIR coefficients, which may be found using various known techniques and algorithms.

At operation 312, the calibration system 100 adjusts a plurality of DUT coefficients based on the plurality of biquadratic coefficients of the compensation curve. An output of the DUT is adjustable based on the DUT coefficients In some embodiments, a digital analog converter (DAC) of the DUT has a front end that has a equalizer (EQ) used for balancing and adjustment. The EQ may be in a form of cascaded biquadratic infinite-impulse response (cascaded biquad-IIR), therefore adjustments made in the EQ may be made by adjusting one or more DUT coefficients of the cascaded biquad-IIR corresponding to the EQ of the DUT. In some embodiments, the adjustments made to the one or more DUT coefficients are made based on the biquadratic coefficients of the compensation curve. After adjusting the plurality of DUT coefficients, the DUT response curve should be more in line with the reference curve.

Figure 3B:
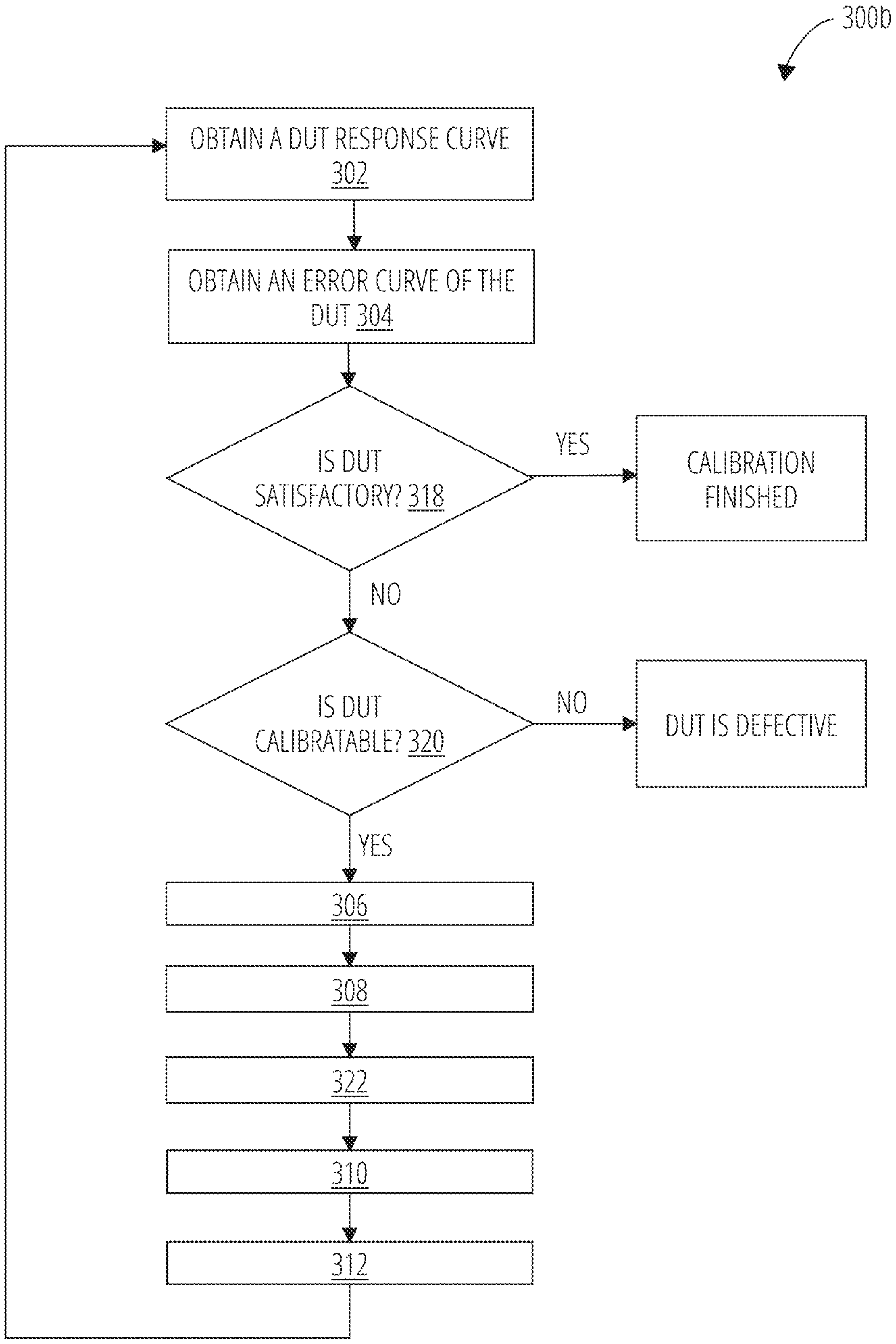
FIG. 3B is a sequence diagram illustrating operations of the calibration system in performing method for calibrating the DUT, in accordance with some embodiments.

FIG. 3B is a sequence diagram illustrating operations of the calibration system in performing method for calibrating the DUT, in accordance with some embodiments. The calibration process may include operations 302, 304, 306, 308, 322, 310, 312, decision 318, and decision 320.

At operation 302, the calibration system 100 obtains a DUT response curve using an acoustic sensor 136, which collects audio output of the DUT and generates the DUT response curve based on the audio output collected.

At operation 304, the calibration system 100 obtains an error curve of the DUT by comparing the DUT response curve with the reference curve.

At decision 318, the calibration system 100 determines whether the DUT is satisfactory. If yes, the calibration process may be finished, ending the calibration process. If no, the calibration system 100 proceeds to decision 320. The calibration system 100 determines whether the DUT is satisfactory based on a characteristic of the error curve. In some embodiments, the calibration system 100 determines whether the DUT is satisfactory based on whether an absolute value of an absolute extrema on the error curve exceeds a predetermined satisfactory threshold. If the absolute value of the absolute extrema on the error curve does not exceed the predetermined satisfactory threshold, the calibration system 100 determines that the DUT is satisfactory. In some embodiments, the predetermined satisfactory threshold is 0.5 dB and an absolute value of a absolute maxima on the error values is 10 dB, then the calibration system 100 determines that the DUT is not satisfactory.

At decision 320, the calibration system 100 determines whether the DUT is calibratable. If yes, the calibration system 100 may proceed to operations 306. If no, the DUT is determined to be defective. The calibration system 100 determines whether the DUT is calibratable based on the characteristic of the error curve. In some embodiments, the calibration system 100 determines whether an absolute value of an absolute extrema on the error curve exceeds a predetermined calibratable threshold. If the absolute value of the absolute extrema on the error curve does not exceed the predetermined calibratable threshold, the calibration system 100 determines that the DUT is calibratable. In some embodiments, the predetermined calibratable threshold is 6 dB and an absolute value of a absolute maxima on the error values is 10 dB, then the calibration system 100 determines that the DUT is not calibratable and defective. In other examples, an absolute value of an absolute extrema on a error curve is 5 dB, smaller than the 6 dB calibratable threshold, the calibration system 100 continues the calibration process.

In the calibration process, the calibration system 100 may further perform operations 306, 308, 322, 310, and 312. After finishing operation 312, the calibration system 100 may restart the calibration process, starting from operation 302.

Figure 4:
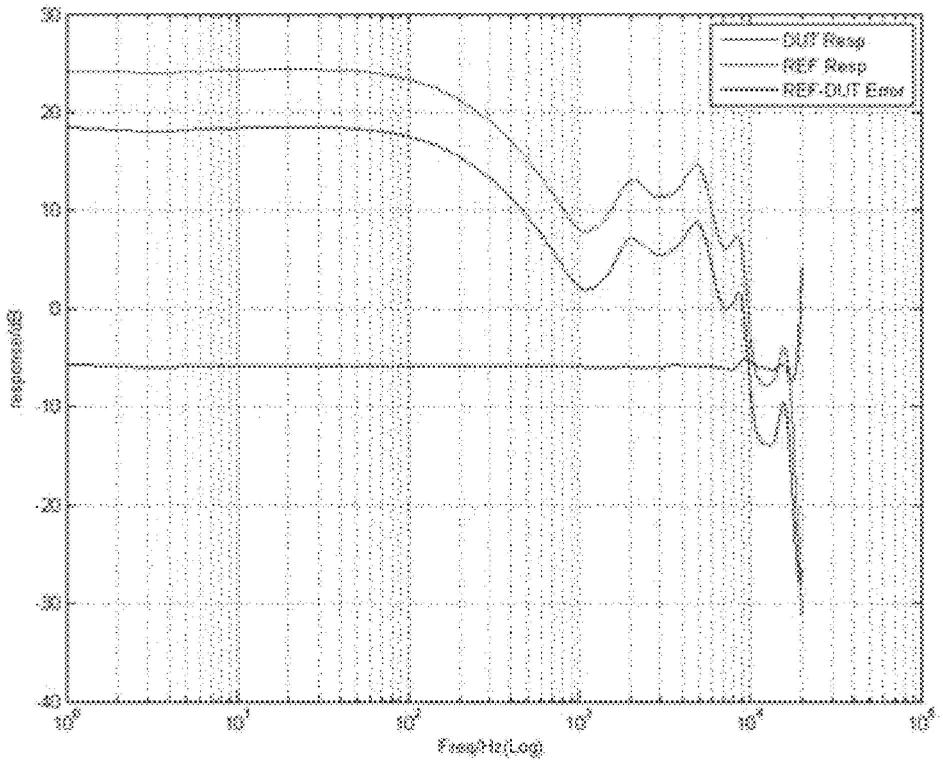
FIG. 4 is a two-dimensional coordinate diagram illustrating an example response-frequency graph, according to some embodiments.

FIG. 4 illustrates an example embodiment of a response-frequency graph including a DUT response curve, a reference curve, and an error curve, according to some embodiments. In this example embodiment, DUT resp curve is the DUT response curve; REF Resp curve is the reference curve; and REF-DUT error curve is the error curve. The response-frequency graph depicts a relationship between a frequency and a response of an output, with the frequency on the X-axis of the response-frequency graph, and the response on the Y-axis. A unit for the response values is decibel (dB). Frequency values on the X-axis are converted to a logarithmic scale to illustrate the relationship better. The unit used for frequency (freq) is denoted as Hz(Log). The frequency values in the logarithmic scale range from $10^0$ Hz(Log) to $10^5$ Hz(Log). The response values range from −40 dB to 30 dB with 10 dB per interval.

The REF Resp curve (on the top at $10^0$ Hz(Log)) is above the DUT Resp curve (in the middle at $10^0$ Hz(Log)) when frequency values are between $10^0$ Hz(Log) to 20,000 Hz(Log). The REF-DUT error curve (on the bottom at $10^0$ Hz(Log)) illustrate the differences in response values of the REF Resp curve and the DUT resp curve. The differences correspond to error values of the DUT. The error values of the DUT may be plotted in either the response-frequency graph or an error-frequency graph (i.e., the graph shown in FIG. 5). In this example embodiment, when frequency values are between $10^0$ Hz(Log) to 7,000 Hz(Log), the error curve has error values at around −6 dB, meaning that the DUT resp curve's response values are about 6 dB less than those of the REF Resp curve. When the frequency values are between 7,000 Hz(Log) to 20,000 Hz(Log), the error values on the error curve have more fluctuations. The error values become positive when frequency values approach 20,000 Hz(Log).

Figure 5:
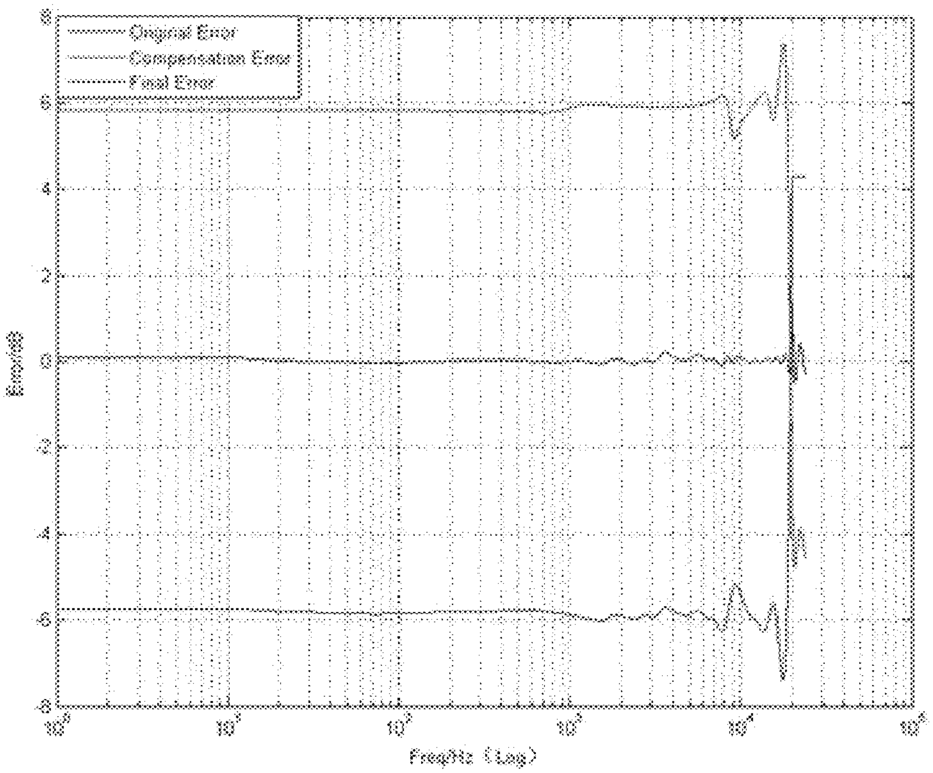
FIG. 5 is a two-dimensional coordinate diagram illustrating an example error-frequency graph, according to some embodiments.

FIG. 5 illustrates an example embodiment of an error-frequency graph including an error curve, a compensation curve, and a post-calibration error curve, according to some embodiments. The error-frequency graph has an X-axis and an Y-axis, with frequency on the X-axis and error on the Y-axis. In this example embodiment, frequency values are on the X-axis and they are in logarithmic scale that range from $10^0$ Hz(Log) to $10^5$ Hz(Log). Error values are on the Y-axis with unit in dB and range from −8 dB to 8 dB. Each interval on the Y-axis is 2 dB. The original error curve (on the bottom at 0 Hz(Log)) is the REF-DUT error curve shown in FIG. 4, the compensation error curve (on the top at 0 Hz(Log)) is a compensation curve generated based on the REF-DUT error curve, and the final error curve (in the middle at 0 Hz(Log)) is generated after aggregating the original error curve and the compensation error curve. The error-frequency graph in this embodiment illustrates that the final error curve having error values closer to 0 dB compared with the error values of the original error curve.

The following examples describe various embodiments of methods, machine-readable media, and systems (e.g., machines, devices, or other apparatus) discussed herein.

1. A method for calibrating audio devices comprising:
- obtaining, by one or more processors of a calibration device, an error curve of an output from a device under test (DUT); identifying, by the one or more processors, a target segment of the error curve;
- determining, by the one or more processors, a compensation curve that corresponds to the error curve based on a compensation function that corresponds to the target segment of the error curve;
- finding, by the one or more processors, a plurality of biquadratic coefficients that correspond to the compensation curve; and
- adjusting, by the one or more processors, a plurality of DUT coefficients based on the plurality of biquadratic coefficients.

2. The method of example 1, wherein the obtaining the error curve of the output from the DUT comprising:
- obtaining a DUT response curve based on the output of the DUT;
- obtaining a reference curve based on a plurality of sample response curves from a predetermined number of sample devices; and
- determining the error curve by identifying differences between the DUT response curve and the reference curve.

3. The method of any of the preceding examples, further comprising:

determining the DUT as defective based on an error value on the error curve exceeding a predetermined calibratable threshold.

4. The method of any of the preceding examples, further comprising:

obtaining a post-calibration DUT response curve based on a post-calibration output of the DUT;

obtaining a post-calibration error curve by comparing the post-calibration DUT response curve with a post-calibration reference curve; and determining the DUT as non-defective based on an error value on the post-calibration error curve not exceeding a predetermined satisfactory threshold.

5. The method of any of the preceding examples, further comprising:

determining the DUT as defective based on the error value on the post-calibration error curve exceeding a predetermined calibratable threshold.

6. The method of any of the preceding examples, wherein the identifying the target segment of the error curve comprises:

determining a local extremum on the error curve; and segmenting the error curve into one or more target segments based on the local extremum.

7. The method of any of the preceding examples, wherein the determining the compensation curve that corresponds to the error curve comprises:

determining the compensation function that corresponds to the target segment of the error curve using a gradient-based maximum-likelihood algorithm.

8. The method of any of the preceding examples, wherein the output from the DUT corresponds to an acoustic power of an audio output of the DUT.

9. A computing apparatus comprising:

one or more processors; and a memory storing instructions that, when executed by the one or more processors, cause the computing apparatus to perform operations of a calibration process comprising:

obtain an error curve of an output from a device under test (DUT);

identify a target segment of the error curve;

determine a compensation curve that corresponds to the error curve based on a compensation function that corresponds to the target segment of the error curve;

find a plurality of biquadratic coefficients that correspond to the compensation curve; and adjust a plurality of DUT coefficients based on the plurality of biquadratic coefficients.

10. The computing apparatus of example 9, wherein the instructions causing the computing apparatus to perform the obtaining an error curve further cause the computing apparatus to perform operations comprising:

obtain a DUT response curve based on the output of the DUT;

obtain a reference curve based on a plurality of sample response curves from a predetermined number of sample devices; and determine the error curve by identifying differences between the DUT response curve and the reference curve.

11. The computing apparatus of any of the preceding examples, wherein the instructions further cause the computing apparatus to perform operations comprising:

determine the DUT as defective based on an error value on the error curve exceeding a predetermined calibratable threshold.

12. The computing apparatus of any of the preceding examples, wherein the instructions further cause the computing apparatus to perform operations comprising:

obtain a post-calibration DUT response curve based on a post-calibration output of the DUT;

obtain a post-calibration error curve by comparing the post-calibration DUT response curve with a post-calibration reference curve; and determine the DUT as non-defective based on an error value on the post-calibration error curve not exceeding a predetermined satisfactory threshold.

13. The computing apparatus of any of the preceding examples, wherein the instructions further cause the computing apparatus to perform operations comprising:

determine the DUT as defective based on the error value on the post-calibration error curve exceeding a predetermined calibratable threshold.

14. The computing apparatus of any of the preceding examples, wherein the instructions causing the computing apparatus to perform the identifying the target segment of the error curve further cause the computing apparatus to perform operations comprising:

determine a local extremum on the error curve; and segment the error curve into a one or more target segments based on the local extremum.

15. The computing apparatus of any of the preceding examples, wherein the instructions causing the computing apparatus to perform the determining the compensation curve that corresponds to the error curve further cause the computing apparatus to perform operation comprising:

determine the compensation function that corresponds to the target segment of the error curve using a gradient-based maximum-likelihood algorithm.

16. The computing apparatus of any of the preceding examples, wherein the output from the DUT corresponds to an acoustic power of an audio output of the DUT.

17. A non-transitory computer-readable storage medium, the computer-readable storage medium including instructions that when executed by a computer, cause the computer to perform operations of calibration process, comprising:

obtain an error curve of an output from a device under test (DUT);

identify a target segment of the error curve;

determine a compensation curve that corresponds to the error curve based on a compensation function that corresponds to the target segment of the error curve;

find a plurality of biquadratic coefficients that correspond to the compensation curve; and adjust a plurality of DUT coefficients based on the plurality of biquadratic coefficients.

18. The non-transitory computer-readable storage medium of example 17, wherein the instructions causing the computer to perform the obtaining an error curve further cause the computer to perform operations comprising:

obtain a DUT response curve based on the output of the DUT;

obtain a reference curve based on a plurality of sample response curves from a predetermined number of sample devices; and determine the error curve by identifying differences between the DUT response curve and the reference curve.

19. The non-transitory computer-readable storage medium of any of the preceding examples, wherein the instructions further cause the computer to perform operations comprising:

determine the DUT as defective based on an error value on the error curve exceeding a predetermined calibratable threshold.

20. The non-transitory computer-readable storage medium of any of the preceding examples, wherein the instructions further cause the computer to perform operations comprising:

obtain a post-calibration DUT response curve based on a post-calibration output of the DUT;

obtain a post-calibration error curve by comparing the post-calibration DUT response curve with a post-calibration reference curve; and determine the DUT as non-defective based on an error value on the post-calibration error curve not exceeding a predetermined satisfactory threshold.

The above descriptions are only embodiments of the present application and are not intended to limit the present application. For those skilled in the art, various modifications and changes may be made to the embodiments of the present application. Any modification, equivalent replacement, improvement, etc. made within the spirit and principle of the present application shall be included within the protection scope of the present application.

What is claimed is:

1. A method for calibrating audio devices comprising:

obtaining, by one or more processors of a calibration device, an error curve of an output from a device under test (DUT);

identifying, by the one or more processors, a target segment of the error curve;

determining, by the one or more processors, a compensation curve that corresponds to the error curve based on a compensation function that corresponds to the target segment of the error curve;

finding, by the one or more processors, a plurality of biquadratic coefficients that correspond to the compensation curve; and adjusting, by the one or more processors, a plurality of DUT coefficients based on the plurality of biquadratic coefficients.

2. The method of claim 1, wherein the obtaining the error curve of the output from the DUT comprising:

obtaining a DUT response curve based on the output of the DUT;

obtaining a reference curve based on a plurality of sample response curves from a predetermined number of sample devices; and determining the error curve by identifying differences between the DUT response curve and the reference curve.

3. The method of claim 2, further comprising determining the DUT as defective based on an error value on the error curve exceeding a predetermined calibratable threshold.

4. The method of claim 2, further comprising:

obtaining a post-calibration DUT response curve based on a post-calibration output of the DUT;

obtaining a post-calibration error curve by comparing the post-calibration DUT response curve with a post-calibration reference curve; and determining the DUT as non-defective based on an error value on the post-calibration error curve not exceeding a predetermined satisfactory threshold.

5. The method of claim 4, further comprising:

determining the DUT as defective based on the error value on the post-calibration error curve exceeding a predetermined calibratable threshold.

6. The method of claim 1, wherein the identifying the target segment of the error curve comprises:

determining a local extremum on the error curve; and segmenting the error curve into one or more target segments based on the local extremum.

7. The method of claim 1, wherein the determining the compensation curve that corresponds to the error curve comprises:

determining the compensation function that corresponds to the target segment of the error curve using a gradient-based maximum-likelihood algorithm.

8. The method of claim 1, wherein the output from the DUT corresponds to an acoustic power of an audio output of the DUT.

9. A computing apparatus comprising:

one or more processors; and a memory storing instructions that, when executed by the one or more processors, cause the computing apparatus to perform operations of a calibration process comprising:

obtain an error curve of an output from a device under test (DUT);

identify a target segment of the error curve;

determine a compensation curve that corresponds to the error curve based on a compensation function that corresponds to the target segment of the error curve;

find a plurality of biquadratic coefficients that correspond to the compensation curve; and adjust a plurality of DUT coefficients based on the plurality of biquadratic coefficients.

10. The computing apparatus of claim 9, wherein the instructions causing the computing apparatus to perform the obtaining an error curve further cause the computing apparatus to perform operations comprising:

obtain a DUT response curve based on the output of the DUT;

obtain a reference curve based on a plurality of sample response curves from a predetermined number of sample devices; and determine the error curve by identifying differences between the DUT response curve and the reference curve.

11. The computing apparatus of claim 10, wherein the instructions further cause the computing apparatus to perform operations comprising:

determine the DUT as defective based on an error value on the error curve exceeding a predetermined calibratable threshold.

12. The computing apparatus of claim 10, wherein the instructions further cause the computing apparatus to perform operations comprising:

obtain a post-calibration DUT response curve based on a post-calibration output of the DUT;

obtain a post-calibration error curve by comparing the post-calibration DUT response curve with a post-calibration reference curve; and determine the DUT as non-defective based on an error value on the post-calibration error curve not exceeding a predetermined satisfactory threshold.

13. The computing apparatus of claim 12, wherein the instructions further cause the computing apparatus to perform operations comprising:

determine the DUT as defective based on the error value on the post-calibration error curve exceeding a predetermined calibratable threshold.

14. The computing apparatus of claim 10, wherein the instructions causing the computing apparatus to perform the identifying the target segment of the error curve further cause the computing apparatus to perform operations comprising:

determine a local extremum on the error curve; and segment the error curve into a one or more target segments based on the local extremum.

15. The computing apparatus of claim 9, wherein the instructions causing the computing apparatus to perform the determining the compensation curve that corresponds to the error curve further cause the computing apparatus to perform operation comprising:

determine the compensation function that corresponds to the target segment of the error curve using a gradient-based maximum-likelihood algorithm.

16. The computing apparatus of claim 9, wherein the output from the DUT corresponds to an acoustic power of an audio output of the DUT.

17. A non-transitory computer-readable storage medium, the computer-readable storage medium including instructions that when executed by a computer, cause the computer to perform operations of calibration process, comprising:

obtain an error curve of an output from a device under test (DUT);

identify a target segment of the error curve;

determine a compensation curve that corresponds to the error curve based on a compensation function that corresponds to the target segment of the error curve;

find a plurality of biquadratic coefficients that correspond to the compensation curve; and adjust a plurality of DUT coefficients based on the plurality of biquadratic coefficients.

18. The non-transitory computer-readable storage medium of claim 17, wherein the instructions causing the computer to perform the obtaining an error curve further cause the computer to perform operations comprising:

obtain a DUT response curve based on the output of the DUT;

obtain a reference curve based on a plurality of sample response curves from a predetermined number of sample devices; and determine the error curve by identifying differences between the DUT response curve and the reference curve.

19. The non-transitory computer-readable storage medium of claim 18, wherein the instructions further cause the computer to perform operations comprising:

determine the DUT as defective based on an error value on the error curve exceeding a predetermined calibratable threshold.

20. The non-transitory computer-readable storage medium of claim 18, wherein the instructions further cause the computer to perform operations comprising:

obtain a post-calibration DUT response curve based on a post-calibration output of the DUT;

obtain a post-calibration error curve by comparing the post-calibration DUT response curve with a post-calibration reference curve; and determine the DUT as non-defective based on an error value on the post-calibration error curve not exceeding a predetermined satisfactory threshold.

* * * * *